United States Patent Office 3,441,363
Patented Apr. 29, 1969

3,441,363
DYEING OF HYDROPHOBIC MATERIALS
Donald Keighley Clough, Bolton, Bradford, England, assignor to Sandoz Ltd. (also known as Sandoz A.G.), Basel, Switzerland
No Drawing. Filed Oct. 7, 1965, Ser. No. 493,911
Int. Cl. D06p 5/02, 1/20
U.S. Cl. 8—39   6 Claims

ABSTRACT OF THE DISCLOSURE

A process for improving the wet fastness and sublimation fastness properties of a dyeing produced with dyestuffs of the anthraquinone series containing amino groups, which consists of aftertreatment of the dyeing with a polyhalogeno-quinone.

---

The present invention provides a process for dyeing, padding or printing hydrophobic organic materials.

In British patent specification No. 926,975 it has been proposed to dye or pad hydrophobic materials by treating them consecutively and in either sequence with aromatic compounds containing primary and/or secondary amine groups or their salts and with (a) quinones or (b) N-haloquinone-imines or N,N'-dihaloquinone di-imines of optionally substituted quinones or (c) the compounds containing the grouping

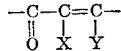

in a non-aromatic carbocylic ring, whereby X and Y denote carbon-carbon bonds or hydrogen or halogen atoms. The dyeing assistants of the groups (a), (b) and (c) are oxidizing agents. We have found that particularly advantageous results, especially if the qualities of wet fastness and fastness to sublimation are required, are obtained by a process of dyeing padding or printing hydrophobic organic materials, such as filaments, fibres, fibre fabrics, films or foils made from semi-synthetic or fully synthetic, high molecular, hydrophobic organic substances, which involves treating said fibers with at least one anthraquinone disperse dyestuff which bears at least two primary or secondary amino groups, i.e. amino groups each of which bears at least one hydrogen atom, alone or in admixture with at least one azo disperse dyestuff, and with a polyhalogeno-quinone.

Suitable hydrophobic organic substances are, for example: Cellulose esters, such as cellulose-2½-acetate and cellulose triacetate and the corresponding propionates, butyrates, acetatopropionates or acetatobutyrates: synthetic polyamides, for example from hexamethylene-diamine and adipic acid (nylon 66) or from hexamethylenediamine and sebacic acid (nylon 610), from ε-caprolactam (nylon 6), from ω-aminoundecanoic acid (nylon 11) or from ε-caprolactam, hexamethylenediamine and adipic acid (nylon 6/66); the linear aromatic polyesters, such as the polycondensates from terephthalic acid with ethyleneglycol or 1,4-bis-(hydroxymethyl)-cyclohexane and the acrylonitrile polymerisation products such, for example, as polyacrylonitrile and the copolymers of at least 80% acrylonitrile, for example 85% acrylonitrile, and 15% vinyl acetate or vinylpyridine, or of 95% acrylonitrile and 5% vinyl acetate.

Examples of the polyaminoanthraquinone dyestuffs for use in the process of the present invention are:

1,4-diaminoanthraquinone,
1,4-bis-(methylamino)-anthraquinone,
1,5-diamino-4,8-dihydroxy-anthraquinone,
1,8-diamino-4,5-dihydroxyanthraquinone,
1,4,5-triaminoanthraquinone,
1,4,5,8-tetraaminoanthraquinone or
1-amino-4-phenylaminoanthraquinone.

Polyhalogeno-quinones which are especially suitable are, for example, 2,3,5,6-tetrachloro-1,4-benzoquinone and 2,3,5,6-tetrabromo-1,4-benzoquinone.

The most important dyestuffs which can be used in addition with one or more anthraquinone disperse dyestuffs bearing at least two primary or secondary amino groups are the azo disperse dyestuffs containing at least one primary or secondary amino group.

The treatment of the hydrophobic organic materials with the polyaminoanthraquinone dispersion dyestuffs (with or without other dyestuffs) and with the polyhalogeno quinones may take different forms. The dyeing or print obtained with the dispersion dyestuff or dyestuffs can be aftertreated in the exhausted dyebath or in a fresh bath with a polyhalogeno quinone, for example in an amount ranging from 0.1 to 20% of the weight of the dyed or printed material at 20° C. to 100° C., optionally in the presence of an acid acceptor. It is also possible to dry the dyeing or print obtained with the dispersion dyestuff or dyestuffs, to impregnate it with a solution of a polyhalogeno quinone, for example of 1 to 10 parts in 100 parts of an organic solvent, to dry it again and then to subject it to a steam or hot air treatment at 100° to 220° C., for example at 100° to 150° C. for the steam treatment, or respectively with dry air heated at 110° to 220° C., for 1 to 30 minutes; the higher the temperature, the shorter the treatment time required.

It is often advantageous to add an acid acceptor. Suitable acid acceptors are, for example, the acetates, bicarbonates, carbonates and hydroxides of sodium or potassium, trisodium phosphate, sodium metasilicate, borax and the like. The acid acceptor is advantageously used in an amount of 2 to 10%, based on the weight of the material treated. In general, the proportion of acid acceptor should be sufficient to ensure that the whole of the hydrohalic acid eliminated during fixing is neutralised.

It is advantageous to add further an emulsifier or dispersant, preferably a nonionic or an anionic one.

The present process is of special value to dyeing cellulose triacetate and polyester fibres. Dark and fast dyeings and prints are obtained in a short time and in an uncomplicated manner. They are very fast to wet treatments, especially to washing, water, seawater and perspiration, and to sublimation, pleating and rubbing (abrasion).

Parts and percentages in the following examples are by weight and temperatures are shown in degree centigrade.

Example 1

A mixture of 20 parts of 2,3,5,6-tetrachloro-1,4-benzoquinone, 10 parts of sodium dinaphthylmethane disulphonate, 1 part of polyvinyl alcohol and 69 parts of water is ground in a ball mill until it forms a fine dispersion.

2 parts of a dyeing preparation containing 30% of 1,4,5,8-tetraamino-anthraquinone, 30% of sodium dinaphthylmethane-disulphonate, 20% of sodium cetyl-sulphate and 20% of sodium sulphate are dispersed with stirring in 400 parts of water. This dyestuff dispersion is poured into 3600 parts of water containing 1.5 parts of sodium stearoylaminoethane sulphonate, and 100 parts of a cellulose triacetate fabric are immersed in this dyebath. The dyebath is raised to the boil within 30 minutes and maintained for 1 hour at 98° to 100°, whereupon it is mixed with 20 parts of the dispersion of 2,3,5,6-tetrachloro-1,4-benzoquinone described above. The dyeing is treated for 60 minutes at 100°, then removed from the bath, rinsed and dried. By this after-treatment the originally blue dyeing becomes grey-blue and its fastness to washing is improved.

When a dyeing preparation is used in which 1,4,5,8-tetraaminoanthraquinone has been replaced by 1,4-diamino-anthraquinone, the originally bright violet tint is shifted to dark violet. If 1,4,5,8-tetraaminoanthraquinone is replaced by 1-amino-4-phenylaminoanthraquinone, by 1,8-diamino-4,5-dihydroxy-anthraquinone, by 1-amino-5-methylamino-4,8-dihydroxy-anthraquinone or by a technical mixture of 1,5-diamino-4,8-dihydroxy-β-[4'-hydroxyphenyl]-anthraquinone and 1,5-diamino-4,8-dihydroxy-β-[4'-methoxy-phenyl]-anthraquinone, the tint becomes darker and the fastness properties, especially the wet fastness properties are improved.

Example 2

2 parts of a dyeing preparation containing 30% of 1,4,5,8-tetraaminoanthraquinone, 30% of sodium dinaphthylmethane disulphonate, 20% of sodium cetylsulphate and 20% of sodium sulphate are pasted with a small amount of water and dispersed with vigorous stirring in 400 parts of water. This dyestuff dispersion is poured into 3600 parts of water containing 2 parts of a highly sulphonated castor oil. 100 parts of a nylon 66 fabric are immersed in this dyebath, which is then raised to the boil within 30 minutes and maintained for 1 hour at 98° to 100°. The bath is then allowed to cool to 90° and 20 parts of the dispersion of 2,3,5,6-tetrachloro-1,4-benzoquinone described in the first paragraph of Example 1 are added. The dyeing is treated for 1 hour at 100°, then taken out of the bath, rinsed and dried. The originally blue shade has turned grey-blue and the treated dyeing displays a substantially improved fastness to washing.

If the after-treatment is performed with 2,3,5,6-tetrachloro-1,4-benzoquinone for 1 hour at 90° in the presence of 8 parts of sodium acetate, the fastness to washing is slightly improved.

When 1,8-diamino-4,5-dihydroxyanthraquinone is used as dyestuff, the originally blue shade shifts to grey-blue and its fastness to washing is substantially improved. Darkness and wet fastness are also improved when 1-amino-5-methylamino-4,8-dihydroxy-anthraquinone or a technical mixture of 1,5-diamino-4,8-dihydroxy-β-(4'-hydroxyphenyl)-anthraquinone and 1,5-diamino-4,8-dihydroxy-β-(4'-methoxyphenyl)-anthraquinone is used as dyestuff.

Dyeings of secondary cellulose acetate which are prepared in an analogous manner and with the same 4 dyestuffs named above and which are aftertreated in the same manner are also darker and faster to wet treatment than the same dyeings which are not aftertreated.

Example 3

2 parts of a dyeing preparation containing 30% of 1,4,5,8-tetraamino-anthraquinone (see Example 1, 2nd paragraph) and 3 parts of a dyeing preparation containing 30% of 1-(4'-amino-phenylazo)-4-aminonaphthalene which was prepared in the same manner are pasted with a small amount of water and the paste is dispersed in 4000 parts of water containing 1.5 parts of a highly sulphonated castor oil. 20 parts of a dichlorobenzene emulsion are then added and 100 parts of a polyethylene terephthalate fibre fabric are immersed in the dyebath; the latter is then raised to 100° and maintained for 1 hour at 98° to 100°. 20 parts of the dispersion of 2,3,5,6-tetrachloro-1,4-benzoquinone described in the first paragraph of Example 1 are then added. The dyeing is treated for 1 hour at 100°, then taken out of the bath, rinsed and dried. The originally brown-black shade turns distinctly less brown. Its fastness to washing at 95°, its abrasion fastness (dry and wet) and its sublimation fastness are distinctly improved.

The reults are equally good when 1,8-diamino-4,5-dihydroxy-anthraquinone or 1,5-diamino-4,8-dihydroxy-anthraquinone are used as dyestuff.

Example 4

3 parts of 4-amino-2'-methyl-4'-amino-5'-methoxy-1,1'-azobenzene, 3.75 parts of 1,4,5,8-tetraaminoanthraquinone and 1.75 parts of 2-bromo-4,6-dinitro-2'-propionylamino-4'-bis-(acetoxyethyl)-amino - 5' - methoxy-1,1'-azobenzene are pasted with a small amount of water and dispersed in 2000 parts of water containing 2 parts of a highly sulphonated castor oil. 6 parts of a diethyl phthalate emulsion and 100 parts of a cellulose triacetate fabric are immersed in the dyebath; the latter is then raised to the boil and maintained at 98 to 100° for 90 minutes. 8 parts of the dispersion of 2,3,5,6-tetrachloro-1,4-benzoquinone described in the first paragraph of Example 1 are then added. The dyeing is treated at 100° for 1 hour, then taken out of the bath, rinsed and dried. The originally green shade turns black and its fastness to washing is distinctly improved.

Example 5

To a solution of 80 parts of ammonium sulphate in 4000 parts of water are added 1.6 parts of formic acid of 90% strength and 2.8 parts of sodium dinaphthylmethanesulphonate. This solution is then heated to 70° C. and 40 parts of an o-phenylphenol emulsion are added at 70° C. 100 parts of a polyethylene terephthalate fibre fabric are entered into this bath at 70° C.; after 5 minutes at 70° C. the pH value of the bath is adjusted to 6 with formic acid. A mixture of 12 parts of 1,4'-diamino-1,1'-benzene azo naphthalene, 4 parts of a technical mixture of 1,5-diamino-4,8-dihydroxy-β-(4'-hydroxyphenyl)-anthraquinone and 1,5-diamino - 4,8-dihydroxy-β-(4'-methoxyphenyl)-anthraquinone and 2 parts of 2-bromo-4,6-dinitro-2'-propionylamino - 4' - bis-(acetoxy)-amino-5'-methoxy-1,1'-azobenzene is dispersed in the bath, which is then heated to 100° C. Dyeing is continued for 90 minutes at the boil. The fabric is rinsed and then treated at 100° C. for 1 hour with a bath of 4000 parts of water containing 6 parts of disodium hydrogen phosphate and 10 parts of the dispersion of 2,3,5,6-tetrachloro-1,4-benzoquinone described in the first paragraph of Example 1. It is then taken out of the bath, rinsed and dried.

A black shade is obtained, the fastness to washing at 95°, abrasion fastness (dry and wet) and sublimation fastness of which are distinctly improved.

Having thus disclosed the invention what I claim is:
1. A process for dyeing, padding or printing hydrophobic organic materials wherein said materials are treated with a polyaminoanthraquinone disperse dyestuff having from 2 to 4 amino groups in the molecule, each amino group bearing at least one hydrogen atom, and with a polyhalogenobenzoquinone.

2. A process according to claim 1 wherein the polyaminoanthraquinone is substituted in each benzenoid ring by at least one amino group bearing at least one hydrogen atom.

3. A process according to claim 1 wherein the polyaminoanthraquinone is substituted in one of the benzenoid rings by more than one amino group bearing at least one hydrogen atom.

4. A process according to claim 1 wherein the polyhalogeno benzoquinone is a member selected from the group consisting of 2,3,5,6-tetrachloro-1,4-benzoquinone and 2,3,5,6-tetrabromo-1,4-benzoquinone.

5. A process according to claim 1 wherein the polyhalogeno benzoquinone is 2,3,5,6-tetrachloro-1,4-benzoquinone.

6. A process according to claim 1 wherein the polyhalogeno benzoquinone is 2,3,5,6-tetrabromo-1,4-benzoquinone.

References Cited

UNITED STATES PATENTS 1,956,030  4/1934  Hopff et al. _____ 8—32 X

FOREIGN PATENTS 926,975  5/1963  Great Britain.

NORMAN G. TORCHIN, *Primary Examiner.*

T. J. HERBERT, JR., *Assistant Examiner.*

U.S. Cl. X.R.

8—55